United States Patent [19]
de Contencin et al.

[11] Patent Number: 5,173,583
[45] Date of Patent: Dec. 22, 1992

[54] SPECULAR SYSTEM FOR RECOVERING LASER BEAM ENERGY

[75] Inventors: François Xavier de Contencin, Fresnes; Gérard Marot, Verrieres Le Buisson; Serge Trottier, Suresnes, all of France

[73] Assignee: Societe Nationale d'etude et de Construction de Moteurs D'Aviation S.N.E.C.M.A., Paris, France

[21] Appl. No.: 706,308

[22] Filed: May 28, 1991

[30] Foreign Application Priority Data

May 28, 1990 [FR] France ................ 90 06567

[51] Int. Cl.$^5$ .............................. B23K 26/06
[52] U.S. Cl. .................................. 219/121.74
[58] Field of Search .......... 219/121.6, 121.85, 121.84, 219/121.74, 121.75, 121.76

[56] References Cited

U.S. PATENT DOCUMENTS

| | | | |
|---|---|---|---|
| 4,288,678 | 9/1981 | La Rocca | 219/121.65 |
| 4,665,298 | 5/1987 | La Rocca | 219/121.71 |
| 5,023,424 | 6/1991 | Vaught | 219/121.6 |

FOREIGN PATENT DOCUMENTS 0174915  3/1986  France.
60-127088  7/1985  Japan.

*Primary Examiner*—C. L. Albritton
*Attorney, Agent, or Firm*—Bacon & Thomas

[57] ABSTRACT

A specular system for recovering the energy of a reflected laser beam is disclosed which has a plurality of reflecting surfaces positioned so as to further reflect the reflected laser beam back onto the workpiece surface. The normals of the reflecting surfaces are displaced from the point at which the laser beam impinges upon the workpiece from a laser head. The reflecting surfaces may be plane or curved and focusing such that they take the form of segments of spheres or cylinders, depending upon the particular application of the system. The reflecting surfaces are characterized by different curvatures or by discontinuous orientations. The reflecting surfaces may be formed on a common reflector, or may be individually formed on separate reflectors. In the latter instance, the separate reflectors may be mutually adjustable both with respect to each other and with respect to the laser head.

14 Claims, 1 Drawing Sheet

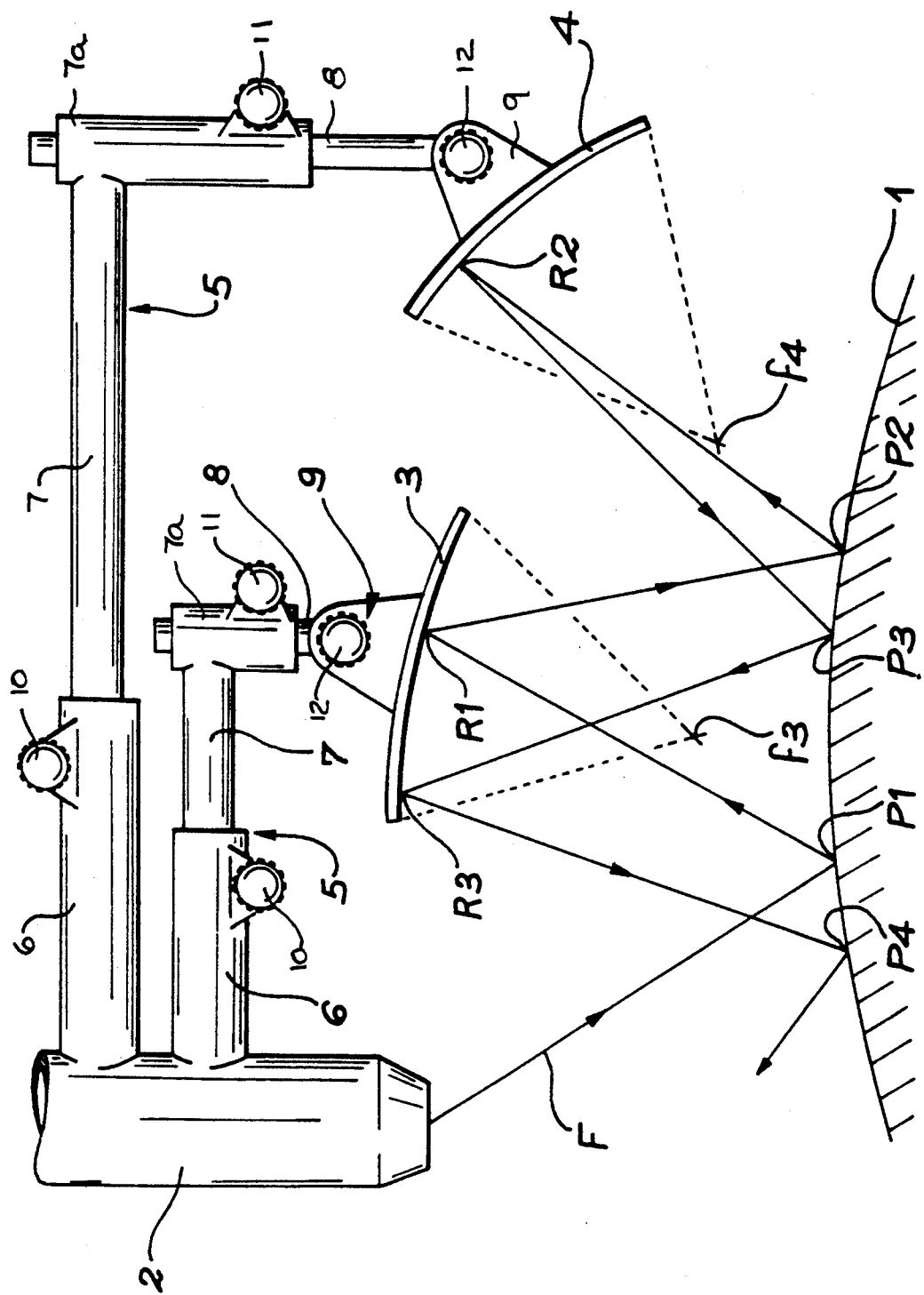

SPECULAR SYSTEM FOR RECOVERING LASER BEAM ENERGY

BACKGROUND OF THE INVENTION

The present invention relates to a specular system for recovering the energy of a laser beam, more particularly a laser beam utilized to heat a workpiece.

It is well-known that laser beam energy may be used to heat workpieces either as a heat treat for the workpiece or to raise its temperature prior to subsequent machining operations. This is accomplished by directing the laser beam onto a point on the surface of the workpiece. The laser beam is typically directed onto the workpiece at an angle and a portion of the energy of the laser beam is reflected by the surface of the workpiece. The proportion of the reflected energy, which may be as high as 80% to 90% of the laser beam, is wasted energy. Accordingly, there is a substantial waste of energy and precautions must be taken to avoid damage which may be caused by the reflected laser beam.

The heat absorption by the workpiece from the laser beam may be increased, under ideal conditions, by adjusting the incidence angle of the beam and the light polarization direction. However, the ideal conditions required by these parameters are very often difficult to ascertain and are difficult to carry out under actual operating conditions. As a practical matter, there is little chance of actually improving the efficiency with this approach.

SUMMARY OF THE INVENTION

A specular system for recovering the energy of a laser beam is disclosed which comprises a plurality of reflecting surfaces positioned so as to further reflect the reflected laser beam back onto the workpiece surface. The normals of the reflecting surfaces are displaced from the point at which the laser beam impinges upon the workpiece from a laser head. The reflecting surfaces may be plane or curved and focusing such that they take the form of segments of spheres or cylinders, depending upon the particular application of the system.

The reflecting surfaces are characterized by different curvatures or by discontinuous orientations. The reflecting surfaces may be formed on a common reflector, or may be individually formed on separate reflectors. In the latter instance, the separate reflectors may be mutually adjustable both with respect to each other and with respect to the laser head.

The specular system according to the invention provides multiple laser beam reflections toward the surface of the workpiece to be treated. The laser head and the reflectors may be arranged in such a manner relative to the workpiece surface such that the laser beam will be reflected from the initial impingement point onto a first reflector which reflects the beam back onto the workpiece surface at a second impingement point. From this second impingement point, the beam is reflected to the second reflector which, in turn, reflects the beam back onto the workpiece surface at a third impingement point. From the third impingement point, the beam is reflected back onto the first reflector which, in turn, reflects the beam back onto the workpiece surface at a fourth impingement point. The system substantially reduces the wasted energy of the laser beam, since each time it impinges the workpiece surface, a portion of its energy is absorbed by the workpiece.

The reflectors may be attached to the laser head, especially in devices wherein the laser beam head is movable with respect to the workpiece surface. The reflectors may be adjustably attached to the laser beam head such that their positions may be adjusted, both with respect to each other and with respect to the laser beam head. In such an arrangement, it is possible to change, as needed, the impingement points of the beam on the workpiece and to achieve a more or less pronounced heat focusing. The reflectors may also be adjusted to match various curvatures and shapes of the workpiece surfaces being treated.

BRIEF DESCRIPTION OF THE DRAWING

The single FIGURE is a front view of the system according to the present invention.

DETAILED DESCRIPTION OF THE PREFERRED EMBODIMENT

The surface 1 of the workpiece being heat treated may be cylindrical in configuration as illustrated in the FIGURE. However, it is to be understood that the system of the invention is not to be limited to use only on such a surface, but may be utilized with virtually any shaped workpiece surface.

Laser head 2 projects a laser beam F onto the workpiece such that the beam F impinges on the surface 1 at point P1.

The specular system comprises a first reflector 3 and a second reflector 4. The reflectors 3 and 4 may be in the shape of a segment of a slightly concave spherical surface having focal points f3 and f4 near the surface 1 being treated, but distinct from one another and distinct from the first impingement point P1. Thus, the normals from all points of the reflectors 3 and 4 are displaced from impingement point P1.

The laser beam F is reflected from the first impingement point P1 such that it arrives at reflector 3 at a first reflection point R1 from which it is again reflected toward the surface 1 being treated. This reflected beam impinges on the surface 1 at second impingement point P2, from which a portion of the beam reflects onto reflection point R2 on second reflector 4. The beam F reflects from reflection point R2 back onto the workpiece surface 1 at impingement point P3. As illustrated in the FIGURE, impingement P3 is located between the impingement points P1 and P2, respectively.

From impingement point P3, the beam is reflected onto first reflector 3 at reflection point R3. From reflection point R3, the beam is reflected back onto the workpiece surface 1 such that it impinges the surface at impingement point P4. From the impingement point P4, the laser beam F reflects away from the system.

It is clear from the foregoing that adjustment of the positions of the reflectors 3 and 4 allows the controlling of the number of the impingement points, as well as the location of such points on the workpiece surface 1. Each reflector 3 and 4 is adjustably attached to the laser head 2 by supports 5. Each of the supports 5 comprises a tube 6 attached to and extending from the laser head 2 generally perpendicular to the longitudinal axis of the laser head. A mounting bar 7 is slidably retained in the tube 6 and has, at its distal end, a second mounting tube 7a. The second mounting tube 7a slidably supports a bar 8 that is pivotally attached to mounting bracket 9 of the reflector 3 or the reflector 4. The positions of the reflectors 3 and 4 may be fixed by tightening screws or wing nuts 10, 11 and 12, in known fashion.

Reflectors 3 and 4 may have relatively long focal lengths which thereby allows the number of impingement points P to be multiplied. This may also be achieved by using a larger number of reflectors than that illustrated in the FIGURE. Although the concept of the invention has been illustrated by a system utilizing two reflectors, is to be understood that the number of reflectors may be increased, if necessary, without exceeding the scope of the present invention.

The foregoing description is provided for illustrative purposes only and should not be construed as in any limiting this invention, the scope of which is defined solely by the appended claims.

We claim:

1. A specular system for recovering the energy of a laser beam emitted from the laser head and reflecting from an impingement point (P1) of a surface of a workpiece comprising: a plurality of reflectors defining a plurality of reflecting surfaces of which the normals of each reflecting surface are displaced from the impingement point (P1), so as to direct the reflected laser beam back onto the workpiece; and attachment means to attach the plurality of reflectors to a laser head, wherein the attachment means is adjustable so as to adjust the positions of the plurality of reflectors.

2. The specular system of claim 1 wherein the plurality of reflectors comprises first and second reflectors.

3. The specular system of claim 2 further comprising mounting means to mount the first and second reflectors such that a laser beam reflecting from an impingement point (P1) on a workpiece surface is reflected by the first reflector back onto the workpiece surface at an impingement point (P2), from impingement point (P2) to the second reflector, from the second reflector onto the workpiece surface at impingement point (P3), from impingement point (P3) onto the first reflector and from the first reflector back onto the workpiece surface at impingement point (P4).

4. The specular system of claim 2 further comprising adjustable mounting means to mount the first and second reflectors such that their positions are mutually adjustable.

5. The specular system of claim 1 wherein the reflecting surfaces comprise focusing surfaces.

6. A specular system for recovering the energy of a laser beam emitted from a laser head and reflecting from an impingement point (P1) of a surface of a workpiece comprising: first and second reflectors having a plurality of reflecting surfaces of which the normals of each reflecting surface are displaced from the impingement point (P1), so as to direct the reflected laser beam onto the workpiece; and mounting means to mount the first and second reflectors such that a laser beam reflecting from an impingement point (P1) on a workpiece surface is reflected by the first reflector back onto the workpiece surface at an impingement point (P2), from impingement point (P2) to the second reflector, from the second reflector onto the workpiece surface at impingement point (P3), from impingement point (P3) onto the first reflector and from the first reflector back onto the workpiece surface at impingement point (P4).

7. The specular system of claim 6 further comprising attachment means to attach the first and second reflectors to a laser head.

8. The specular system of claim 7 wherein the attachment means is adjustable so as to adjust the positions of the first and second reflectors.

9. The specular system of claim 6 further comprising adjustable mounting means to mount the first and second reflectors such that their positions are mutually adjustable.

10. The specular system of claim 6 wherein the reflecting surfaces comprise focusing surfaces.

11. A specular system for recovering the energy of a laser beam emitted from a laser head and reflecting from an impingement point (P1) of a surface of a workpiece comprising: first and second reflectors having a plurality of reflecting surfaces of which the normals of each reflecting surface are displaced from the impingement point (P1), so as to direct the reflected laser beam onto the workpiece; and adjustable mounting means to mount the first and second reflectors such that their positions are mutually adjustable.

12. The specular system of claim 11 further comprising attachment means to attach the plurality of reflectors to a laser head.

13. The specular system of claim 12 wherein the attachment means is adjustable so as to adjust the positions of the plurality of reflectors.

14. The specular system of claim 11 wherein the reflecting surfaces comprise focusing surfaces.

* * * * *

UNITED STATES PATENT AND TRADEMARK OFFICE
CERTIFICATE OF CORRECTION

PATENT NO. : 5,173,583

DATED : December 22, 1992

INVENTOR(S) : de Contencin et al.

It is certified that error appears in the above-identified patent and that said Letters Patent is hereby corrected as shown below:

Col. 2, line 46, after "impingement" insert --point--.

Signed and Sealed this

Second Day of November, 1993

Attest:

BRUCE LEHMAN

Attesting Officer

Commissioner of Patents and Trademarks